United States Patent

Yuge et al.

Patent Number: 5,457,138
Date of Patent: Oct. 10, 1995

[54] METHOD FOR PRODUCING OPEN CELL RIGID POLYURETHANE FOAM

[75] Inventors: Kiyohiro Yuge, Yawata; Hitoshi Muramatsu, Chiba, both of Japan

[73] Assignee: Takeda Chemical Industries, Ltd., Japan

[21] Appl. No.: 989,561

[22] Filed: Dec. 11, 1992

[30] Foreign Application Priority Data

Dec. 17, 1991 [JP] Japan .................................. 3-333349

[51] Int. Cl.⁶ ........................................................ C08J 9/08
[52] U.S. Cl. ............................ 521/125; 521/124; 521/137; 521/139; 521/159; 521/170; 521/172; 521/174; 521/902
[58] Field of Search .................... 521/159, 172, 521/174, 902, 124, 125, 137, 170, 139

[56] References Cited

U.S. PATENT DOCUMENTS

| | | | |
|---|---|---|---|
| 4,098,732 | 7/1978 | Yukuta et al. | 521/125 |
| 4,607,064 | 8/1986 | Kuhn et al. | 521/902 |
| 4,668,555 | 5/1987 | Uekado et al. | 428/69 |
| 4,774,268 | 9/1988 | Marx et al. | 521/902 |
| 4,946,872 | 8/1990 | Thomas et al. | 521/174 |
| 4,972,004 | 11/1990 | Randall et al. | 521/902 |
| 5,109,031 | 4/1992 | Snider | 521/172 |
| 5,143,941 | 9/1992 | Rossio et al. | 521/174 |
| 5,164,422 | 11/1992 | Londrigan et al. | 521/902 |
| 5,167,884 | 12/1992 | Rossio et al. | 521/174 |
| 5,177,117 | 1/1993 | Coe et al. | 521/902 |
| 5,187,204 | 2/1993 | Jackson et al. | 521/174 |
| 5,250,579 | 10/1993 | Smits et al. | 521/134 |
| 5,260,344 | 11/1993 | Ashida et al. | 521/131 |
| 5,281,632 | 1/1994 | Smits et al. | 521/134 |
| 5,312,846 | 5/1994 | Smits et al. | 521/134 |
| 5,350,777 | 9/1994 | Yuge et al. | 521/124 |

FOREIGN PATENT DOCUMENTS

| | | |
|---|---|---|
| 0078445 | 5/1983 | European Pat. Off. . |
| 0188806 | 7/1986 | European Pat. Off. . |
| 1457824 | 11/1966 | France . |
| 1102391 | 2/1968 | United Kingdom . |

Primary Examiner—James J. Seidleck
Assistant Examiner—Rabon Sergent
Attorney, Agent, or Firm—Wenderoth, Lind & Ponack

[57] ABSTRACT

A method of producing an open cell rigid polyurethane foam which comprises reacting a polymethylene polyphenylisocyanate prepolymer with a polyol at an NCO/OH equivalent ratio of 1.3 to 3.0 by use of a blowing agent substantially comprising water in the presence of a catalyst, a foam stabilizer and a cell opening agent.

9 Claims, No Drawings

METHOD FOR PRODUCING OPEN CELL RIGID POLYURETHANE FOAM

This invention relates to a method of producing an open cell rigid polyurethane foam, and more particularly, to a method of producing a rigid polyurethane foam which has open microcells with no scorching by use of a blowing agent substantially comprising water.

A rigid polyurethane foam is a good heat insulating material having excellent moldability and processability, and is in wide use as a heat insulating material in refrigerators, buildings, low temperature warehouses, storage tanks, refrigerator ships, or pipings. The rigid foam has been improved in heat conductivity year by year, and has at present a value of 0.015 W/mK on a commercial basis. Thus it is said that the rigid polyurethane foam has the smallest heat insulating conductivity of the heat insulating materials presently used around normal temperatures. Nevertheless, further reduction of heat insulating conductivity is increasingly demanded.

For the production of a rigid polyurethane foam, a one shot method is usually employed wherein an A component mainly composed of a polyol, a catalyst, a foam stabilizer and a blowing agent and a B component mainly composed of an organic polyisocyanate are mixed together so that the components react to carry out a foaming process and a curing process in parallel, thereby to form a foam.

Among the blowing agents used in the production of such a rigid polyurethane foam, trichlorofluoromethane or R-11 is well known. However, the conventional chlorofluoro carbons (CFS's) exemplified by R-11 are chemically stable so that they diffuse into the stratosphere to destroy the ozone layer. As results, the solar ultraviolet radiation is not absorbed by the ozone layer, but it reaches the surface of the earth, and is causing a global environmental problem. For this reason, the use of CFS's has been limited since 1989, and the use of R-11 for the production of polyurethane foam as well.

In general, the heat conductivity of a heat insulating material composed of a closed cell polyurethane foam can not be made smaller than that of a blowing agent used in the production of the foam. Accordingly, it is almost impossible to produce a closed cell polyurethane foam having such a small heat conductivity as has been hitherto achieved if a substitute for R-11 must be used as a blowing agent.

Thus, a vacuum insulating material has been recently given attention again which is composed of a core material enclosed in a vacuum container of metal-plastic laminate films, as disclosed in Japanese Patent Application Laid-open No. 64-4112. There are already known two kinds of core materials for use in vacuum insulating materials. One is an inorganic material such as perlite, and the other is an organic material such as an open cell polyurethane foam. The inorganic material is inferior in workability to the organic materials, and in addition, it is of a high density and cost.

On the other hand, an open cell rigid polyurethane foam is free from such problems as above involved in the inorganic core material. However, when CFC's are used as a blowing agent in the production of an open cell rigid polyurethane foam, it is required from the standpoint of global environmental protection that all the amount of the CFC's used is recovered. This will necessitate a number of large and expensive pieces of equipment.

It will be apparent that the use of water as a sole blowing agent is free from the above problem. As well known, water reacts with an organic polyisocyanate compound to produce carbon dioxide, and is thus useful as a chemical blowing agent. However, when water is used as a sole blowing agent in the production of a rigid polyurethane foam, the resulting foam has a temperature as high as about 200° C. inside the foam while the foam is formed since no CFC is used which acts as a removing agent of reaction heat by heat of evaporation which the CFC needs when it evaporates. Moreover, while an open cell rigid polyurethane foam is formed, the air readily penetrates deeply into the resultant foam where a high temperature is reached as mentioned above, so that an oxidation reaction readily takes place, and consequently, it usually takes place that the resultant open cell rigid polyurethane foam readily carbonizes in a few minutes.

When an open cell rigid polyurethane foam is used as a core material, the heat conductivity of the resultant vacuum heat insulating material is largely dependent upon the cell size. The conventional open cell rigid polyurethane foam has an average cell size of 300–1000 μm, and accordingly, it is necessary to make the inside of the foam reach to such a high level of vacuum of about 0.001 mmHg in order to obtain a high performance vacuum insulating material. However, it needs infeasibly much time to make such an open cell rigid polyurethane foam having an average cell size of about 300–1000 μm vacuous to such a high level of vacuum as above stated. Moreover, the heat conductivity of vacuum heat insulating material is susceptible to a gas released from the materials themselves used therein under such a high level of vacuum. Accordingly, it is required that an open cell rigid polyurethane foam has a smaller cell size so that the resultant vacuum heat insulating material maintains such a small heat conductivity as required over a long period of time.

It is, therefore, an object of the invention to provide a method of producing an open cell rigid polyurethane foam with no scorching or burning by use of a blowing agent substantially comprising water in place of CFC's.

According to the invention, there is provided a method of producing an open cell rigid polyurethane foam which comprises reacting a polymethylene polyphenylisocyanate prepolymer with a polyol at an NCO/OH equivalent ratio of 1.3 to 3.0 by use of a blowing agent substantially comprising water in the presence of a catalyst, a foam stabilizer and a cell opening agent.

The polyol includes a polyether polyol which has a functionality of 2–8 and a hydroxyl value of 300–600 mg KOH/g and which is used in the production of conventional rigid polyurethane foam, and a polyester polyol which has a functionality of 2–4 and a hydroxyl value of 250–500 mg KOH/g and which is used in the production of conventional rigid polyurethane foam. There may also be used a phenolic resin which has reactive methylols. Among these polyols is preferred a polyether polyol having a hydroxyl value of 300–600 mg KOH/g which is obtained as an addition product of ethylene oxide or propylene oxide or both to a compound containing hydroxyl groups such as trimethylol propane or sorbitol, or a polyamino compound such as o-tolylene diamine or m-tolylene diamine.

The polymethylene polyphenylisocyanate prepolymer used in the invention is obtained by the reaction of a polymethylene polyphenylisocyanate (hereinafter, somewhere, referred to as pHDI) of the formula

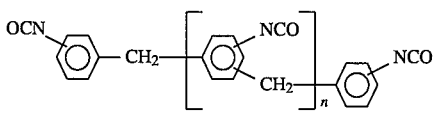

wherein n is an integer of 0-6, which is commercially available, with a compound containing hydroxyl groups therein, and has an amine equivalent preferably of 140-200 mg KOH/g. There may be used as the compound containing hydroxyl groups therein, for example, a monoalcohol or phenolic compound having a functionality of one and a molecular weight of 32-300, or a polyol having a functionality of two to three and a molecular weight of 62-600. Accordingly, the compound containing hydroxyl groups therein used may be exemplified by a monoalcohol such as methanol, ethanol, n-butanol, ethylene glycol monomethyl ether or diethylene glycol monomethyl ether; a diol such as bigphenol A, o-, m- or p-cresol, ethylene glycol, diethylene glycol, propylene glycol, 1,4-butanediol or 1,6-hexanediol; a triol such as glycerine, trimethylol propane; other polyfunctional alcohols such as methyl glucoside, sucrose, sorbitel or dulucitel.

There may also be used a polyether polyol or polyester polyol of two to three functionality as a compound containing hydroxyl groups therein. The polyether polyol may be obtained by polymerization of an alkylene oxide such as ethylene oxide, propylene oxide, butylene oxide or a mixture of two or more of these with use of such diol, triol or polyfunctional alcohol as above mentioned as an initiator. In turn, the polyester polyol may be obtained by the condensation reaction of a polyol such as ethylene glycol, diethylene glycol, 1,4-butanediol or trimethylol propane with a dicarboxylic acid such as adipic acid, succinic acid, maleic anhydride or phthalic acid.

It is particularly preferred that i n the present invention there is used a polymethylene polyphenyl isocyanate prepolymer which is obtained by the reaction of a polymethylene polyphenylisocyanate with a compound containing hydroxyl groups therein, such as ethylene glycol monomethyl ether or a polyether polyol obtained by use of trimethylol propane, sucrose or bisphenol has an initiator.

The polymethylene polyphenylisocyanate prepolymer is obtained as above, and it may be used as a mixture of two or more. The prepolymer may be used together with tolylene diisocyanate or its prepolymer.

According to the invention, an open cell rigid polyurethane foam is produced by the reaction of the polymethylene polyphenylisocyanate prepolymer with a polyol at an NCO/OH equivalent ratio of 1.3 to 3.0, preferably in the range of 1.5-2.5, by use of a blowing agent substantially comprising water in the presence of a catalyst, a foam stabilizer and a cell opening agent.

The catalyst may be a known isocyanurating catalyst, and accordingly the catalyst used includes, for example, an amine catalyst such as 2,4,6-tris(dimethylaminomethyl)phenol, triethylamine, N,N',N"-tris (dimethylaminopropyl) hexahydrotriazine, triethylene diamine, diazabicycloundecene or tetramethylhexanediamine; a carboxylic acid alkali metal salt such as potassium acetate, potassium benzoate, potassium 2-ethylhexanoate or potassium naphthenate; a strongly basic metal hydroxide such as potassium hydroxide, sodium hydroxide or calcium hydroxide; an alcholate or a phenolate such as potassium phenolate or sodium methoxide. The above catalyst may be used singly or as a mixture.

The above catalyst may further be used together with a conventional catalyst used in the production of rigid polyurethane foams. The conventional catalyst may include, for example, a tertiary amine such as dimethylethanolamine, triethylenediamine, tetramethylethylenediamine, tetramethylpropylenediamine, tetramethylhexamethylenediamine or dimethylcyclohexylamine; an organometallic compound such as stannous octoate, dibutyltin dilaurate or lead octanoate; or a tertiary amine carboxylate.

The catalyst may be used in an amount of 0.01-20% by weight based on the amount of the organic isocyanate used. The catalyst may be used as a mixture.

There may be used as a foam stabilizer, for example, a silicone surfactant such as an organopolysiloxane, an organopolysiloxane-polyoxyalkylenecopolymer, a polyalkenylsiloxane having polyoxyalkylene side chains, a fluorinated surfactant, a cationic, artionic or nonionic surfactant. The foam stabilizer may be used in an amount of 0.2-10% by weight based on the polyol used.

The cell opening agent used may be a known powdery divalent metal salt of a saturated carboxylic acid, preferably a fatty acid, such as calcium stearate, magnesium stearate, strontium stearate, zinc stearate or calcium myristate, as disclosed in Japanese Patent application Laid-open No. 61-153480, or a powder of a thermoplastic resin such as polyethylene, as disclosed in Japanese Patent application Laid-open No. 61-153478. The cell opening agent may be used in an amount of 0.1-20% by weight based on the polyol used.

According to the method of the invention, there is used a blowing agent substantially comprising water, and preferably water may be used as a sole blowing agent. The amount of the blowing agent is suitably selected according to the density required to the resultant rigid polyurethane foam, but it is usually in the range of 1-20% by weight based on the polyol used.

The above raw materials are evenly mixed together by use of, for example, a foaming machine, to readily provide an open microcell rigid polyurethane foam with no scorching or burning.

The open microcell rigid polyurethane foam produced according to the invention as above set forth may be used advantageously as a vacuum heat insulating material.

Such a vacuum heat insulating material is obtained by enclosing the thus obtained open microcell rigid polyurethane foam in a container composed of metal-plastic laminate films. Such a vacuum heat insulating material may be advantageously used in a variety of uses.

As above set forth, the method of the invention provides an open microcell rigid polyurethane foam with no scorching or burning by use of polymethylene polyphenylisocyanate prepolymer in such an NCO/OH equivalent ratio of 1.3 to 3.0 in relation to the polyol used, by use of a blowing agent substantially comprising water, omitting the use of CFC's as a blowing agent in the presence of a catalyst, a foam stabilizer and a cell opening agent.

The thus obtained open cell rigid polyurethane foam has a very fine open microcell structure as compared with the conventional rigid polyurethane foams, and also complete open cell structure. Accordingly, as above described, such an open cell rigid polyurethane foam provides under readily available vacuum conditions a vacuum heat insulating material of an improved heat insulating performance.

The invention will now be described in more detail with reference to examples and reference examples, however, the invention is not limited thereto.

The materials used in the examples and reference examples are as follows:

| | |
|---|---|
| Polyether polyol | Addition product of alkylene oxide to trimethylol propane, of a hydroxyl value of 450 mg KOH/g |
| Polyester polyol | Condensation product of phthalic acid and diethylene glycol, of a hydroxyl value of 315 mg KOH/g |
| Catalyst | Potassium acetate |
| Foam stabilizer | Silicone surfactant (F-373 available from Shin-etsu Kagaku Kogyo K.K.) |
| Blowing agent A | R-11 |
| Blowing agent B | Water |
| Cell opening agent | Calcium stearate |
| Polyisocyanate A | pMDI*) |
| Polyisocyanate B | Prepolymer obtained by the reaction of pMDI and bisphenol A-propylene oxide adduct, of an amine equivalent of 150 |
| Polyisocyanate C | Prepolymer obtained by the reaction of tolylene diisocyanate and glycerine-sucrose-propylene oxide adduct, of an amine equivalent of 150 |
| Polyisocyanate D | Prepolymer obtained by the reaction of pMDI and diethylene glycol monomethyl ether, of an amine equivalent of 170 |

*)pMDI: polymethylene polyphenylisocyanate

The materials as indicated in Table 1 were mixed together with a high speed mixer for a period of five seconds at a temperature of 30±1° C. so that they reacted to form an open cell rigid polyurethane foam. The following day the resultant foam was cut to check whether there was scorching in the foam. The cell size was also determined based on electro-microphotographs. The results are indicated in Table 1.

resultant foam was isocyanurated, there was attained an improvement in heat resistance in the resultant foam, and hence there was seen no scorching in the foam. However, the foam was found to have a large cel size. Also as indicated in Reference Example 4, if a polymethylene polyphenylisocyanate prepolymer was used as an organic polyisocyanate, there was obtained a foam having a small cell size, but yet scorching took place when a small NCO/OH ratio was employed.

In contrast, according to the invention, as indicated in Examples 1, 2, 4 and 5, when a polymethylene polyphenylisocyanate prepolymer was reacted with a polyol in an NCO/OH ratio in the range of 1.3–3.0 in the presence of water as a blowing agent, there were obtained open cell rigid polyurethane foams having a small cell size and no scorching therein. There was likewise obtained a rigid polyurethane foam having the properties almost the same as the above foams when a mixture of polymethylene polyphenylisocyanate prepolymer and a tolylene diisocyanate prepolymer were used.

However, if the same polymethylene polyphenylisocyanate prepolymer as in Examples 1 or 2 was used in an NCO/OH ratio as high as 3.5, as indicated in Reference Example 5, the reaction was found to proceed in a very unstable manner so that foams were broken. Thus, the reaction fails to provide a foam having open microcells.

What is claimed is:

1. A method of producing an open cell rigid polyurethane foam having a complete open microcell structure which comprises reacting a polymethylene polyphenylisocyanate prepolymer with a polyol at an NCO/OH equivalent ratio of 1.3 to 3.0 by use of a blowing agent consisting essentially of

TABLE 1

| | Examples | | | | | Reference Examples | | | | |
|---|---|---|---|---|---|---|---|---|---|---|
| | 1 | 2 | 3 | 4 | 5 | 1 | 2 | 3 | 4 | 5 |
| Production of Foams[1)] | | | | | | | | | | |
| Polyether polyol | 100 | 100 | 00 | 100 | | 100 | 100 | 100 | 100 | 100 |
| Polyester polyol | | | | | 100 | | | | | |
| Catalyst | 3 | 3 | 3 | 3 | 3 | 3 | 3 | 3 | 3 | 3 |
| Foam stabilizer | 2 | 2 | 2 | 2 | 2 | 2 | 2 | 2 | 2 | 2 |
| Blowing agent A | | | | | | 30 | | | | |
| Blowing agent B | 3 | 3 | 3 | 3 | 3 | | 3 | 3 | 3 | 3 |
| Cell opening agent | 1 | 1 | 1 | 1 | 1 | 1 | 1 | 1 | 1 | 1 |
| Polyisocyanate A | | | | | | 120 | 170 | 278 | | |
| Polyisocyanate B | 255 | 307 | 153 | 511 | | | | | 187 | 596 |
| Polyisocyanate C | | | 153 | | | | | | | |
| Polyisocyanate D | | | | | 274 | | | | | |
| NCO/OH Ratio | 1.5 | 1.8 | 1.8 | 3.0 | 1.8 | 1.1 | 1.1 | 1.8 | 1.1 | 3.5 |
| Properties of Foams | | | | | | | | | | |
| Cell size (μm) | 140 | 150 | 140 | 140 | 150 | 300 | 350 | 370 | 150 | — |
| Scorching[2)] | No | No | No | No | No | No | Yes | No | Yes | — |

Notes:
[1)]Parts by weight
[2)]No: There was found no scorching; Yes: There was observed carbonization of foams.

In Reference Example 1, a polymethylene polyphenylisocyanate was reacted with a polyol in an NCO/OH ratio of 1.1 by use of R-11 as a blowing agent. The resultant foam was found to have a cell size as small as of about 300 μm, with no scorching. However, as indicated in Reference Example 2, if water was used as a blowing agent merely in place of R-11, the resultant foam was found to have a larger cell size but also scorching therein.

In the meantime, as indicated in Reference Example 3, when a large NCO/OH ratio was employed so that the water in the presence of a catalyst, a foam stabilizer and a cell opening agent selected from the group consisting of a powdery divalent metal salt of a saturated carboxylic acid and a powder of a thermoplastic resin.

2. The method as claimed in claim 1 wherein the polyol is a polyether polyol having a functionality of 2 to 8 and and a hydroxyl value of 300 to 600 mg KOH/g.

3. The method as claimed in claim 1 wherein the polyol is a polyester polyol having a functionality of 2 to 4 and a hydroxyl value of 250 to 500 mg KOH/g.

4. The method as claimed in claim 1 wherein the polymethylene polyphenylisocyanate prepolymer has an amine equivalent of 140 to 200 mg KOH/g.

5. The method as claimed in claim 1 wherein the reaction of the polymethylene polyphenylisocyanate prepolymer with the polyol is carried out at an NCO/OH equivalent ratio of 1.5 to 2.5.

6. The method as claimed in claim 1 wherein water is used as the sole blowing agent.

7. The method as claimed in claim 1 wherein the divalent metal salt of a saturated carboxylic acid is calcium myristate, magnesium stearate, strontium stearate, zinc stearate or calcium stearate.

8. The method as claimed in claim 1 wherein the thermoplastic resin is polyethylene.

9. An open cell rigid polyurethane foam having a complete open microcell structure produced by reacting a polymethylene polyphenylisocyanate prepolymer with a polyol at an NCO/OH equivalent ratio of 1.3 to 3.0 by use of a blowing agent consisting essentially of water in the presence of a catalyst, a foam stabilizer and a cell opening agent selected from the group consisting of a powdery divalent metal salt of a saturated carboxylic acid and a powder of a thermoplastic resin.

* * * * *